(12) United States Patent
Huang et al.

(10) Patent No.: US 11,807,802 B2
(45) Date of Patent: Nov. 7, 2023

(54) NANO-ORGANOSILICON FILM-FORMING AND HYDROPHOBIC SHALE SURFACE HYDRATION INHIBITOR AND ITS PREPARATION METHOD AND APPLICATION

(71) Applicant: CHINA UNIVERSITY OF PETROLEUM (EAST CHINA), Qingdao (CN)

(72) Inventors: Xianbin Huang, Qingdao (CN); Jinsheng Sun, Qingdao (CN); He Li, Qingdao (CN); Kaihe Lv, Qingdao (CN); Jingping Liu, Qingdao (CN); Jiafeng Jin, Qingdao (CN); Jintang Wang, Qingdao (CN); Yingrui Bai, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 4 days.

(21) Appl. No.: 17/653,030

(22) Filed: Mar. 1, 2022

(65) Prior Publication Data
US 2022/0228050 A1  Jul. 21, 2022

Related U.S. Application Data

(63) Continuation of application No. PCT/CN2021/072983, filed on Jan. 21, 2021.

(51) Int. Cl.
*C09K 8/22* (2006.01)

(52) U.S. Cl.
CPC ............ *C09K 8/22* (2013.01); *C09K 2208/10* (2013.01); *C09K 2208/12* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 4,541,489 A * | 9/1985 | Wu ...................... | C09K 8/5755 166/295 |
| 10,202,542 B2 * | 2/2019 | Zhang .................... | C09K 8/88 |

(Continued)

FOREIGN PATENT DOCUMENTS

WO   WO-2022151516 A1 *  7/2022  ............... C09K 8/03

*Primary Examiner* — John J Figueroa
(74) *Attorney, Agent, or Firm* — CBM PATENT CONSULTING, LLC

(57) ABSTRACT

A nano-organosilicon film-forming and hydrophobic shale surface hydration inhibitor is obtained by performing hydrophobic modification for nano-particles through long-chain organosilicon together with a surface-active agent. A preparation method of the said hydrophobic shale surface hydration inhibitor comprises steps as follows: nano-particles are added to the solvent under stirring conditions, and then an ultrasonic dispersion is performed; upon the end of the ultrasonic dispersion, the reaction system is adjusted to a pH of 9-11 to obtain mixed solution A; a long-chain organosilicon solution is then dropwise added to the mixed solution A for reaction under stirring conditions to obtain mixed solution B; a surface-active agent is added to the mixed solution B for reaction under stirring conditions; upon the reaction is finished, part of the solvent is removed to obtain the inhibitor.

9 Claims, 1 Drawing Sheet

(56) References Cited

U.S. PATENT DOCUMENTS

| | | | |
|---|---|---|---|
| 10,428,265 B2* | 10/2019 | Nguyen | E21B 33/138 |
| 2017/0369769 A1* | 12/2017 | Burks | C09K 8/86 |
| 2020/0369936 A1* | 11/2020 | Bai | C09K 8/03 |

* cited by examiner

NANO-ORGANOSILICON FILM-FORMING AND HYDROPHOBIC SHALE SURFACE HYDRATION INHIBITOR AND ITS PREPARATION METHOD AND APPLICATION

CROSS REFERENCES

This application is the continuation of International Application No. PCT/CN2021/072983 filed on 21 Jan. 2021 which designated the U.S. and claims priority to Chinese Application No. CN202110064041.7 filed on 18 Jan. 2021, the entire contents of each of which are hereby incorporated by reference.

FIELD OF THE INVENTION

The present invention relates to a kind of nano-organosilicon film-forming and hydrophobic shale surface hydration inhibitor and its preparation method and application. It pertains to the field of oilfield chemistry in the petroleum industry.

BACKGROUND OF THE INVENTION

Shale formations are the most common formations (75%) encountered by oil and gas drilling, and among them, 90% are with unstable wellbore walls. Therefore, shale formations, especially hard and brittle shale formations, are prone to troublesome conditions. Shale is an inhomogeneous body composed of clay and non-clay minerals, with clay minerals as the main components. As clay minerals are sensitive to fluids, after the drilling fluid filtrate intrudes the formations, the shale gets hydrated and swollen easily, resulting in decreased strength of the shale and then wellbore instability. Wellbore instability can lead to slow drilling speed and long well-construction cycle, increase drilling cost and downhole complex accidents, affect well-cementing quality, and even lead to wellbore abandonment in serious cases. Therefore, the wellbore stability of the shale formations is very important for safe and efficient drilling.

Shale hydration swelling can be divided into two stages, namely surface hydration and osmotic hydration. Surface hydration is the first stage of shale hydration. It involves the direct adsorption of water molecules by hydrogen bonds on the clay surface and the indirect adsorption of water molecules by the adsorbed exchangeable cations. It originates from the interaction between clay and water in a short distance under the drive of the surface free energy of the shale. The thickness of water molecules adsorbed on the surface is about 4 water molecules. Therefore, the surface hydration has a small swelling amount but an extremely large swelling pressure. The surface hydration is followed by osmotic hydration, the second stage of clay hydration. A significant osmotic hydration phenomenon happens only when the cation exchange capacity of the clay minerals is large enough. As the cation concentration in between the crystal layers differs from the concentration of the solution, a driving force (the electrical double layer repulsion and the osmotic repulsion) pushes water to enter the crystal layers, increasing the interlayer spacing to form a diffuse double layer. The osmotic hydration stage has a small swelling pressure but a long acting distance (more than 10 nm).

For shale gas formations in Southwest China, the clay minerals are dominated by illite. Additionally, deep shale formations generally have high illite content and little or no montmorillonite content. Featuring high surface activity, illite is prone to surface hydration, with high hydration speed and swelling stress, small swelling amount but extremely large swelling pressure. Therefore, hard and brittle shale formations with high illite content seldom have a necking down phenomenon but are prone to peeling off and collapse. In fact, surface hydration inhibition is also very important for shale with high montmorillonite content. Therefore, surface hydration inhibition plays an important role in the wellbore stability of shale formations.

The driving force of the shale surface hydration is surface-free energy. Therefore, as long as the surface free energy is reduced by bringing down the surface hydrophilicity of the shale, the shale surface hydration will be inhibited. However, current water-based drilling fluid inhibitors have the following disadvantages: (1) Most of the existing shale inhibitors cannot change the hydrophilicity of the rock surface (namely they cannot change the contact angle of the water phase on the rock surface), or can only do very tiny changes to the wettability, which helps little to inhibit surface hydration. However, the hard and brittle shale formations have high illite content and are prone to surface hydration, so these inhibitors have a limited inhibition effect on them. (2) Though wettability-modified shale inhibitors can reduce the surface free energy by lowering the hydrophilicity of the shale surface to inhibit shale surface hydration, they also have several problems, including insufficient wettability change, poor compatibility with drilling fluids, and poor inhibiting effect. Additionally, the wettability-modified shale inhibitors currently available are mostly surface-active agents, for example, long-chain quaternary ammonium salt surface-active agent. Such surface-active agent inhibitors bubble easily in the drilling fluids, which affects the filtration property of the drilling fluids. (3) The existing shale inhibitors also behave poorly in temperature resistance. For example, the polyether amine inhibitors are prone to ether bond breakage at high temperatures, presenting poor inhibition performance.

Therefore, a high-temperature-resistant inhibitor capable of inhibiting shale surface hydration is in urgent need.

SUMMARY OF THE INVENTION

To address the drawbacks in the prior art, especially the insufficient wettability change, poor compatibility with drilling fluid, and poor inhibiting effect of the existing wettability-modified shale inhibitors, the present invention provides a kind of nano-organosilicon film-forming and hydrophobic shale surface hydration inhibitor and its preparation method and application.

A Technical Solution of the Present Invention is Provided Below a kind of nano-organosilicon film-forming and hydrophobic shale surface hydration inhibitor, wherein the said shale surface hydration inhibitor is obtained by performing hydrophobic modification for nano-particles through long-chain organosilicon together with a surface-active agent; the said long-chain organosilicon is a long carbon chain alkyl-trialkoxysilane; the said long carbon chain alkyl is a C8-C18 straight-chain alkyl group; the said surface-active agent is hexadecyl trimethyl ammonium chloride, hexadecyl trimethyl ammonium bromide, octadecyl trimethyl ammonium bromide, docosyl trimethyl ammonium chloride, or dodecyl trimethyl ammonium bromide; the said nanoparticles are nano-silicon dioxide, nano-alumina, or nano-calcium carbonate.

Preferably according to the present invention, the said long-chain organosilicon is octyl triethoxy silane, dodecyl trimethoxy silane, cetyl trimethoxy silane, or octadecyl trimethoxy silane; the said nanoparticles are with a particle size of 20-30 nm.

According to the present invention, a preparation method of the said nano-organosilicon film-forming and hydrophobic shale surface hydration inhibitor, comprising steps as follows:

(1) Nano-particles are added to the solvent under the stirring condition, and then an ultrasonic dispersion is performed; upon the end of the ultrasonic dispersion, the reaction system is adjusted to a pH of 9-11 to obtain mixed solution A; an alkaline environment helps to keep the suspension stability of nano-silicon dioxide;

(2) A long-chain organosilicon solution is dropwise added to the mixed solution A to react under stirring conditions to obtain mixed solution B;

(3) A surface-active agent is added to the mixed solution B for reaction under stirring conditions; upon the reaction is finished, part of the solvent is removed to obtain the nano-organosilicon film-forming and hydrophobic shale surface hydration inhibitor.

Preferably according to the present invention, the solvent in step (1) is a mixed solution of water and ethanol; the volume ratio of water and ethanol in the mixed solution is 4-6:1 and is preferred to be 5:1.

Preferably according to the present invention, in step (1), the ratio between the mass of the nanoparticles and the volume of the solvent is 0.08-0.15 g: 1 mL.

Preferably according to the present invention, in step (1), the reaction system is adjusted to a pH of 9-11 by NaOH aqueous solution with a mass fraction of 20%.

Preferably according to the present invention, the said long-chain organosilicon solution in step (2) is obtained by dissolving long-chain organosilicon in ethanol; the mass ratio of the long-chain organosilicon to the ethanol is 5~8: 10~30; the mass ratio of the long-chain organosilicon to the nanoparticles is 5~8:10~15.

Preferably according to the present invention, in step (2), the said stirring speed is 150~300 r/min, the said reaction temperature is 40~60° C., and the reaction time is 1~2 h.

Preferably according to the present invention, in step (3), the mass ratio between the surface-active agent and the nanoparticles is 5~8:8~12.

Preferably according to the present invention, in step (3), the said stirring speed is 500~700 r/min, the said reaction temperature is 60~80° C., and the reaction time is 4~6 h.

Preferably according to the present invention, in step (3), the said part of the solvent is removed with the reduced pressure distillation method to obtain the nano-organosilicon film-forming and hydrophobic shale surface hydration inhibitor with a solids content of 20-22%; the pressure of the reduced pressure distillation is 0.1 MPa, and the temperature is 50° C.; the said nano-organosilicon film-forming and hydrophobic shale surface hydration inhibitor is a white emulsion.

According to the present invention, an application of the said nano-organosilicon film-forming and hydrophobic shale surface hydration inhibitor to inhibit shale hydration and swelling and stabilize wellbore walls; the specific application method is as follows: the resulting nano-organosilicon film-forming and hydrophobic shale surface hydration inhibitor is added to water-based drilling fluids at a dosage of 5 g-30 g/L.

The Technical Characteristics and Beneficial Effects of the Invention are as Follows 1. The nano-organosilicon film-forming and hydrophobic shale surface hydration inhibitor prepared in the present invention can significantly change the surface wettability of the wellbore walls, enabling the wettability reversal of the rock surface and presenting excellent inhibition and anti-collapse performance. On one hand, the shale surface hydration inhibitor in the present invention can reduce the surface free energy of the shale to inhibit surface hydration. This is because that the resulting inhibitor is a nano-level inhibitor with high surface activity, and the negative charges on its surface can be absorbed by the surfaces of the cuttings to block the micropores and form a dense hydrophobic film, thereby significantly reducing the water phase in the drilling fluid that intrudes into the rocks and inhibiting shale hydration and dispersion. On the other hand, it can reduce the intrusion of the drilling fluid filtrate into the formations and effectively inhibit the osmotic hydration of clay.

2. The nano-organosilicon film-forming and hydrophobic shale surface hydration inhibitor in the present invention has little impact on the rheological and filtration properties of drilling liquids and good compatibility with the drilling fluid system. It overcomes the deficiencies of the existing common wettability-modified shale inhibitors, such as poor compatibility with drilling liquids and poor inhibition performance.

3. The surface-active agent used to prepare the nano-organosilicon film-forming and hydrophobic shale surface hydration inhibitor in the present invention has a carbon-carbon (C—C) backbone that can resist high temperatures without chain breakage. Therefore, the resulting shale surface hydration inhibitor has excellent temperature resistance and meets the drilling fluid requirements under high-temperature and ultra-high-temperature conditions.

EMBODIMENTS

Figure 1:
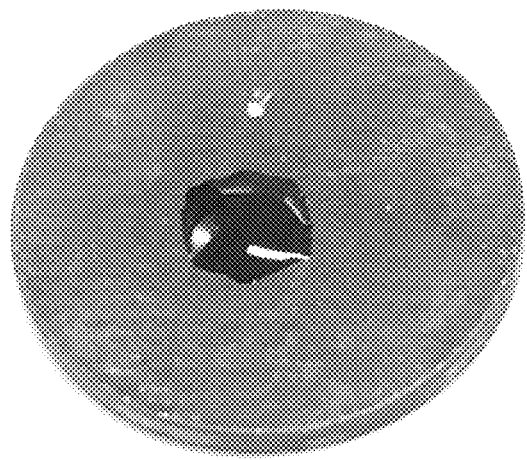
FIG. 1 shows the contact angle of the water phase on the untreated slabbed core surface.

The present invention will be illustrated in detail with reference to the embodiments; however, the present invention is not limited thereto.

Unless otherwise specified, the experimental methods in the following embodiments are all conventional methods; the reagents and materials are all commercially available unless otherwise specified.

The nano-silicon dioxide, nano-alumina, and nano-calcium carbonate used in the embodiments are all with a particle size of 20~30 nm.

Embodiment 1

A preparation method of the said nano-organosilicon film-forming and hydrophobic shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of octyl triethoxy silane is dissolved in 20 g of ethanol to prepare the long-chain organosilicon solution; then, the long-chain organosilicon solution is dropwise added to the mixed solution A resulting from step (1) in 20 min to react under a stirring speed of 200 r/min and a temperature of 40° C. for 1 h to obtain mixed solution B;

(3) 10 g of hexadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Embodiment 2

A preparation method of the said nano-organosilicon film-forming and hydrophobic shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of dodecyl trimethoxy silane is dissolved in 20 g of ethanol to prepare the long-chain organosilicon solution; then, the long-chain organosilicon solution is dropwise added to the mixed solution A resulting from step (1) in 20 min to react under a stirring speed of 200 r/min and a temperature of 60° C. for 1 h to obtain mixed solution B;

(3) 8 g of hexadecyl trimethyl ammonium bromide is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Embodiment 3

A preparation method of the said nano-organosilicon film-forming and hydrophobic shale surface hydration inhibitor, comprising steps as follows:

(1) 10 g of nano-calcium carbonate is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of cetyl trimethoxy silane is dissolved in 20 g of ethanol to prepare the long-chain organosilicon solution; then, the long-chain organosilicon solution is dropwise added to the mixed solution A resulting from step (1) in 20 min to react under a stirring speed of 200 r/min and a temperature of 40° C. for 1 h to obtain mixed solution B;

(3) 8 g of hexadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Embodiment 4

A preparation method of the said nano-organosilicon film-forming and hydrophobic shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of cetyl trimethoxy silane is dissolved in 10 g of ethanol to prepare the long-chain organosilicon solution; then, the long-chain organosilicon solution is dropwise added to the mixed solution A resulting from step (1) in 20 min to react under a stirring speed of 200 r/min and a temperature of 60° C. for 1 h to obtain mixed solution B;

(3) 10 g of hexadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Embodiment 5

A preparation method of the said nano-organosilicon film-forming and hydrophobic shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of cetyl trimethoxy silane is dissolved in 10 g of ethanol to prepare the long-chain organosilicon solution;

then, the long-chain organosilicon solution is dropwise added to the mixed solution A resulting from step (1) in 20 min to react under a stirring speed of 200 r/min and a temperature of 40° C. for 1 h to obtain mixed solution B;

(3) 8 g of octadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Embodiment 6

A preparation method of the said nano-organosilicon film-forming and hydrophobic shale surface hydration inhibitor, comprising steps as follows:

(1) 10 g of nano-alumina is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of octyl triethoxy silane is dissolved in 20 g of ethanol to prepare the long-chain organosilicon solution; then, the long-chain organosilicon solution is dropwise added to the mixed solution A resulting from step (1) in 20 min to react under a stirring speed of 200 r/min and a temperature of 40° C. for 1 h to obtain mixed solution B;

(3) 10 g of hexadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nano-organosilicon film-forming and hydrophobic shale surface hydration inhibitor.

Comparative Example 1

A preparation method of the nanometer shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of octyl triethoxy silane is added to the mixed solution A resulting from step (1) to react under a stirring speed of 200 r/min and a temperature of 40° C. for 1 h to obtain mixed solution B;

(3) 10 g of hexadecyl trimethyl ammonium chloride is added to the mixed solution B resulting from step (2) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nanometer shale surface hydration inhibitor.

This comparative example adds the organosilicon into the mixed solution A directly during the preparation of the nanometer shale surface hydration inhibitor.

Comparative Example 2

The preparation method of the nanometer shale surface hydration inhibitor according to Embodiment 1, provided however that, in step (1), the pH of the reaction system is not adjusted after the ultrasonic dispersion of nanoparticles.

Comparative Example 3

A preparation method of the nanometer shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 10 g of hexadecyl trimethyl ammonium chloride is added to the mixed solution A resulting from step (1) under a stirring speed of 600 r/min to react for 4 h under the same stirring condition and a temperature of 60° C.; upon the reaction is finished, part of the solvent is removed with a vacuum distillation unit under 0.1 MPa and 50° C. to obtain a white emulsion with a solids content of 20%, namely the nanometer shale surface hydration inhibitor.

This comparative example does not add organosilicon while preparing the nanometer shale surface hydration inhibitor.

Comparative Example 4

A preparation method of the nanometer shale surface hydration inhibitor, comprising steps as follows:

(1) 10 g of nano-silicon dioxide is added to the mixed solvent of 100 mL water and 20 mL ethanol under the stirring condition of a 300 r/min stirring speed, and then an ultrasonic dispersion is performed for 0.5 h under room temperature; upon the end of the ultrasonic dispersion, the resulting solution is transferred into a three-neck flask and stirred slowly at a stirring speed of 300 r/min; then, the reaction system is adjusted to a pH of 9 by NaOH aqueous solution with a mass fraction of 20% to obtain mixed solution A.

(2) 5 g of octyl triethoxy silane is dissolved in 20 g of ethanol to prepare the long-chain organosilicon solution; then, the long-chain organosilicon solution is dropwise added to the mixed solution A resulting from step (1) in 20 min to react under a stirring speed of 200 r/min and a temperature of 40° C. for 1 h; upon the reaction is finished, part of the solvent in the reaction mixture is removed with a vacuum distillation unit under 0.1 MPa and 50° C. to obtain a white emulsion with a solids content of 20%, namely the nanometer shale surface hydration inhibitor.

This comparative example does not add a surface-active agent while preparing the nanometer shale surface hydration inhibitor.

Test Example

The following tests are performed for the inhibitors from Embodiments 1-6 and Comparative Examples 1-4: compatibility test with drilling fluids, performance test of inhibiting shale swelling, performance test of inhibiting shale hydration and dispersion, test on modifying rock wettability, and compressive strength test.

1. Evaluation for Compatibility with Drilling Fluids

Preparation of the Base Mud:

16 g of bentonite is slowly added to 400 mL of distilled water under the stirring condition. Then, the solution is sealed and aged for 24 h at room temperature to prepare 4% bentonite base mud.

Drilling Fluid Sample Preparation:

4 g of the inhibitors from different embodiments and comparative examples are added to 400 mL of the base mud respectively and stirred at a high speed of 8000 r/min for 20 min to obtain drilling fluid samples with 1% inhibitor concentration.

Performance Test:

The rheological parameters (apparent viscosity and plastic viscosity) and normal temperature and normal pressure filtration of the prepared drilling fluid samples are tested according to the American Petroleum Institute standard (API RP 13B-1, 2009) to evaluate the impacts of the inhibitors from the embodiments and comparative examples on the rheological and filtration properties of the base mud, and the results are shown in Table 1.

TABLE 1

Experimental results of the rheological and filtration properties of the drilling fluids after the inhibitors are added

| Sample | Apparent viscosity (mPa · s) | Plastic viscosity (mPa · s) | Normal temperature and normal pressure filtration (mL) |
| --- | --- | --- | --- |
| Base mud | 6 | 4 | 22 |
| Base mud + 1% Embodiment 1 | 8 | 4 | 26 |
| Base mud + 1% Embodiment 2 | 9 | 5 | 29 |
| Base mud + 1% Embodiment 3 | 9 | 5 | 30 |
| Base mud + 1% Embodiment 4 | 7 | 3 | 24 |
| Base mud + 1% Embodiment 5 | 8 | 4 | 25 |
| Base mud + 1% Embodiment 6 | 7 | 4 | 26 |
| Base mud + 1% Comparative Example 1 | 8 | 4 | 36 |
| Base mud + 1% Comparative Example 2 | 9 | 4 | 29 |
| Base mud + 1% Comparative Example 3 | 9 | 4 | 30 |
| Base mud + 1% Comparative Example 4 | 9 | 5 | 29 |

As can be seen from Table 1, the filtration loss and viscosity of the drilling fluid increase slightly after the inhibitors from different embodiment and comparative examples are added. However, generally, the rheological and filtration properties are little changed, indicating that the inhibitors from the embodiments are well compatible with the drilling fluids.

2. Performance Evaluation of Inhibiting Shale Swelling

Performance test: The 16 h linear swelling of the bentonite is tested according to the petroleum and natural gas industry standard *Evaluation Procedure of Drilling Fluids Shale Inhibitor* (SY/T 6335-1997) of the People's Republic of China, and the experimental results are shown in Table 2.

TABLE 2

Swelling of rock samples in different solutions

| Solution | Temprature (° C.) | Swelling (mm) |
| --- | --- | --- |
| Clean water | 25 | 8.42 |
| 5% KCl | 25 | 6.14 |
| 1% Embodiment 1 | 25 | 4.19 |
| 1% Embodiment 2 | 25 | 4.26 |
| 1% Embodiment 3 | 25 | 4.28 |
| 1% Embodiment 4 | 25 | 3.95 |
| 1% Embodiment 5 | 25 | 3.53 |
| 1% Embodiment 6 | 25 | 3.68 |
| 1% Comparative Example 1 | 25 | 5.11 |
| 1% Comparative Example 2 | 25 | 5.86 |
| 1% Comparative Example 3 | 25 | 5.98 |
| 1% Comparative Example 4 | 25 | 5.23 |

As can be seen from Table 2, after 16 hours, the linear swelling of the core sample in clean water is 8.42 mm, and that in 5% KCl solution is 6.24 mm. By contrast, the linear swelling of the core samples in the 1% solutions of nano-organosilicon film-forming and hydrophobic shale surface hydration inhibitors from the embodiments of the present invention all have significant decrease, among which, in the solution of the nano-organosilicon film-forming and hydrophobic shale surface hydration inhibitor from Embodiment 5, the linear swelling of the core sample is reduced to 3.53 mm, indicating that the nano-organosilicon inhibitors from the embodiments of the present invention have strong inhibition performance and can inhibit clay hydration and swelling effectively. The linear swelling of the core samples in the 1% solutions of inhibitors from the comparative examples, although reduced, is still higher than that of the embodiments of the invention.

3. Performance Evaluation of Inhibiting Shale Hydration and Dispersion

The shale rolling recovery rate is one of the commonly used experiments to evaluate the inhibition performance of inhibitors. 50 g of dry cuttings with a particle size of 6-10 meshes are weighed and added to each aging can respectively; then, 350 ml of the 1% solutions of the inhibitors from the embodiments and comparative examples are added to the cans. After sealing, the aging cans are aged under 150° C. and 240° C. respectively for 16 h. After hot aging, the cuttings in each can are poured out and into a 40-mesh standard sieve and rinsed with running water for 1 minute; then the remaining cuttings in the sieve are dried for 4 h to a constant weight. The mass of the screened residual rock samples after hot aging of the cuttings in 350 mL tap water is also measured according to the above procedures. The cuttings used are the shale outcrop samples from a region in Sichuan. The calculation formula of the cuttings rolling recovery rate is as follows $$R = \frac{m_2}{m_1} \times 100\%$$

Where: R: the shale rolling recovery rate (%); $m_1$: Initial rock sample mass (g); $m_2$: Mass of recovered rock sample from the sample solution (g). The experimental results of the shale rolling recovery rates are shown in Table 3.

TABLE 3

Experimental results of the cuttings recovery rates after aging at 150° C. and 240° C.

| Sample | Cutting recovery rate after aging at 150° C. (%) | Cutting recovery rate after aging at 240° C. (%) |
|---|---|---|
| Clean water | 7.8 | 6.3 |
| 1% Embodiment 1 | 75.3 | 65.1 |
| 1% Embodiment 2 | 77.5 | 61.2 |
| 1% Embodiment 3 | 75.1 | 57.5 |
| 1% Embodiment 4 | 82.6 | 71.8 |
| 1% Embodiment 5 | 84.4 | 68.3 |
| 1% Embodiment 6 | 82.7 | 67.1 |
| 1% Comparative Example 1 | 45.5 | 38.3 |
| 1% Comparative Example 2 | 40.3 | 36.6 |
| 1% Comparative Example 3 | 31.7 | 23.7 |
| 1% Comparative Example 4 | 38.6 | 31.2 |

As can be seen from Table 3, the recovery rate of the cuttings in clean water is only 7.8% at 150° C. and 6.3% at 240° C., indicating that the cuttings used are highly sensitive to water and seriously hydrated and dispersed when exposed to water. By contrast, the rolling recovery rates of the 1% solutions of the nano-organosilicon film-forming and hydrophobic shale surface hydration inhibitors from the embodiments all exceed 68% no matter at 150° C. or 240° C., indicating that the nano-organosilicon film-forming and hydrophobic shale surface hydration inhibitors in the present invention have excellent inhibition performance and good temperature resistance and can present an inhibition effect even at a high temperature of 240° C. This is because that the resulting inhibitors are nano-level inhibitors with high surface activity, and the negative charges on their surfaces can be absorbed by the surfaces of the cuttings to block the micropores and form dense hydrophobic films, thereby significantly reducing the water phases in the drilling fluids that intrude into the rocks and inhibiting shale hydration and dispersion. The nanoparticles used have good rigidity and temperature resistance, and the cations used are surface-active and have a carbon-carbon (C—C) backbone that can resist high temperatures without chain breakage. Therefore, the resulting nano-organosilicon inhibitors have excellent temperature resistance.

4. Evaluation of Modifying Rock Wettability

Preparation of Inhibitor Sample Solutions:

3.5 g of the inhibitors from the embodiments and comparative examples are added slowly under the stirring condition to 350 mL of water respectively; then, the solutions are stirred at a stirring speed of 300 r/min for 20 min to obtain the 1% inhibitor sample solutions;

Performance Test:

Well-cut shale slices are placed at the bottom of each aging can; then, 350 mL of the solutions of the inhibitors from the embodiments and comparative examples are added to the cans respectively; after sealing, the cans are heated at 150° C. for 16 h. Upon cooling, the shale slices are taken out and dried at 105° C. for 30 min. Then, the water phase contact angles of the shale slices are measured with the Germany DataPhysics OCA 25 contact angle tester, and the measurement results are shown in Table 4.

TABLE 4

Water phase contact angles of the shale slices after being treated with inhibitor solutions

| Sample | Temperature (° C.) | Contact angle (°) |
|---|---|---|
| Clean water | 150 | 13 |
| 1% Embodiment 1 | 150 | 140 |
| 1% Embodiment 2 | 150 | 136 |
| 1% Embodiment 3 | 150 | 141 |
| 1% Embodiment 4 | 150 | 145 |
| 1% Embodiment 5 | 150 | 131 |
| 1% Embodiment 6 | 150 | 140 |
| 1% Comparative Example 1 | 150 | 52 |
| 1% Comparative Example 2 | 150 | 47 |
| 1% Comparative Example 3 | 150 | 32 |
| 1% Comparative Example 4 | 150 | 39 |

As can be seen from Table 4, the water phase contact angle of the shale slice is only 13° after being immersed in clean water, indicating that the shale slice has strong hydrophilicity. By contrast, the water phase contact angles of the shale slices all exceed 90° after being treated with the 1% solutions of the inhibitors from the embodiments, indicating that the wettability of the shale surface has reversed from strong hydrophilic to hydrophobic. This is because that the nano-organosilicon inhibitors from the invention have cations on the surfaces, which can be adsorbed by the shale surfaces due to the electrostatic interaction with the clay, and the absorbed cations then form dense hydrophobic films on the shale surfaces to prevent water molecules from intruding, presenting a hydrophobic inhibition effect.

Figure 2:
FIG. 2 shows the contact angle of the water phase on the surface of a shale slice treated with the 1% inhibitor solution resulting from Embodiment 1.

FIG. 1 shows the contact angle of the water phase on the untreated core surface, and FIG. 2 shows the contact angle of the water phase on the shale slice surface after being treated with the 1% solution of the inhibitor from Embodiment 1. It is evident that the inhibitors from the embodiments can modify the wettability of the shale surfaces. As the shale surface free energy is the driving force of the shale surface hydration, reducing the adsorption of water molecules on the shale will inhibit the shale surface hydration. The resulting products from the embodiments can increase the surface contact angles of the shale and reduce the surface free energy, thereby inhibiting shale surface hydration.

5. Evaluation of Shale Compressive Strength 5 cm-long and 2.5 cm-diameter shale core samples are dried for 6 h at 100° C. in a drying cabinet and placed at the bottom of each aging can upon cooling down; then, clean water and the 3% solutions of the inhibitors from the embodiments and comparative examples are added to the cans respectively to immerse the shale samples; after sealing, the cans are heated for 72 h at 150° C. The uniaxial compression characteristics of the shale samples are tested with a TAW-2000 triaxial rock tester at an axial deformation velocity of 0.00125 mm/s, and the test results are shown in Table 5.

TABLE 5

Uniaxial compressive strength of the shale slices after being treated with inhibitor solutions

| Sample | Temperature (° C.) | Uniaxial compressive strength (MPa) |
|---|---|---|
| Original core | 150 | 110.82 |
| Clean water | 150 | 60.34 |
| 3% Embodiment 1 | 150 | 100.26 |
| 3% Embodiment 2 | 150 | 97.75 |

TABLE 5-continued

Uniaxial compressive strength of the shale slices after being treated with inhibitor solutions

| Sample | Temperature (° C.) | Uniaxial compressive strength (MPa) |
| --- | --- | --- |
| 3% Embodiment 3 | 150 | 98.54 |
| 3% Embodiment 4 | 150 | 103.51 |
| 3% Embodiment 5 | 150 | 106.47 |
| 3% Embodiment 6 | 150 | 102.89 |
| 3% Comparative Example 1 | 150 | 80.62 |
| 3% Comparative Example 2 | 150 | 84.25 |
| 3% Comparative Example 3 | 150 | 76.51 |
| 3% Comparative Example 4 | 150 | 72.64 |

As can be seen from Table 5, shale has dense pores, and, through them, water intrudes into the shale, resulting in the decline of shale strength. After the shale sample is soaked in clean water for 72 h, its compressive strength decreases from 110.82 mpa to 60.34 mpa. By contrast, the share samples soaked in the solutions of the inhibitors from the embodiments change little in compressive strength and have almost the same compressive strength as the initial value. This is because that the nano-organosilicon inhibitor particles can block the micro-pores after entering the shale, and then block the water channels to prevent water from intruding, thus reducing the decrease of the shale compressive strength. However, the shale samples treated with the solutions of the inhibitors from the comparative examples also have large drops in compressive strength.

As can be seen from the above, the nano-organosilicon film-forming and hydrophobic shale surface hydration inhibitors from the embodiments in the present invention use nano-organosilicon and surface-active agents for double hydrophobic modification and excellent hydrophobic effects, so the resulting products of the embodiments have excellent inhibition performance and can improve the compressive strength performance and temperature resistance of the rocks. By contrast, when the organosilicon is added directly into the solution as described in Comparative Example 1, the extent of reaction is low due to the poor solvability of the organosilicon. In Comparative Example 2, as the pH value is not adjusted, the nanoparticles carry fewer hydroxyl groups on the surfaces, resulting in low reactivity and insufficient extent of reaction with the long-chain organosilicon. As a result, the inhibitors from the Comparative Examples 1 and 2 behave not well no matter in hydrophobic effect, or inhibition performance, or mitigating compressive strength decrease. Comparative Example 3 fails to perform long-chain organosilicon hydrophobic modification and conducts surface-active agent hydrophobic modification only, so the inhibitor is not hydrophobic enough, resulting in reduced inhibition performance and compressive strength decrease mitigating performance compared to the embodiments. Similarly, Comparative Example 4 conducts long-chain organosilicon hydrophobic modification only and fails to perform surface-active agent hydrophobic modification, so the inhibitor is not hydrophobic enough either, resulting in reduced inhibition performance and compressive strength decrease mitigating performance compared to the embodiments. The inhibitors in the present invention use nano-organosilicon and surface-active agents for double hydrophobic modification and excellent hydrophobic effects, so they have excellent inhibition performance and can improve the compressive strength performance and temperature resistance of the rocks.

What is claimed is:

1. A nano-organosilicon film-forming and hydrophobic shale surface hydration inhibitor, wherein the said shale surface hydration inhibitor is obtained by performing hydrophobic modification of nano-particles with a long-chain organosilicon together with a surface-active agent; the said long-chain organosilicon is a long carbon chain alkyl-trialkoxysilane; the said long carbon chain alkyl is a C8-C18 straight-chain alkyl group; the said surface-active agent is hexadecyl trimethyl ammonium chloride, hexadecyl trimethyl ammonium bromide, octadecyl trimethyl ammonium bromide, docosyl trimethyl ammonium chloride, or dodecyl trimethyl ammonium bromide; the said nano-particles are nano-silicon dioxide, nano-alumina, or nano-calcium carbonate.

2. The said nano-organosilicon film-forming and hydrophobic shale surface hydration inhibitor according to claim 1, wherein the said long-chain organosilicon is octyl triethoxy silane, dodecyl trimethoxy silane, cetyl trimethoxy silane, or octadecyl trimethoxy silane, and the said nanoparticles are with a particle size of 20-30 nm.

3. A preparation method of the said nano-organosilicon film-forming and hydrophobic shale surface hydration inhibitor according to claim 1, comprising steps as follows:
   (1) Nano-particles are added to the solvent under stirring conditions, and then an ultrasonic dispersion is performed; upon the end of the ultrasonic dispersion, the reaction system is adjusted to a pH of 9-11 to obtain mixed solution A;
   (2) A long-chain organosilicon solution is dropwise added to the mixed solution A to react under stirring conditions to obtain mixed solution B;
   (3) A surface-active agent is added to the mixed solution B for reaction under stirring conditions; upon the reaction is finished, part of the solvent is removed to obtain the nano-organosilicon film-forming and hydrophobic shale surface hydration inhibitor.

4. The said preparation method of the nano-organosilicon film-forming and hydrophobic shale surface hydration inhibitor according to claim 3, wherein the solvent in step (1) is a mixed solution of water and ethanol; the volume ratio of water and ethanol in the mixed solution is 4-6:1 and preferred to be 5:1; the ratio between the mass of the nanoparticles and the volume of the solvent is 0.08-0.15 g: 1 mL.

5. The said preparation method of the nano-organosilicon film-forming and hydrophobic shale surface hydration inhibitor according to claim 3, wherein, in step (1), the reaction system is adjusted to a pH of 9-11 by NaOH aqueous solution with a mass fraction of 20%.

6. The said preparation method of the nano-organosilicon film-forming and hydrophobic shale surface hydration inhibitor according to claim 3, wherein the said long-chain organosilicon solution in step (2) is obtained by dissolving long-chain organosilicon in ethanol; the mass ratio of the long-chain organosilicon to the ethanol is 5~8:10~30; the mass ratio of the long-chain organosilicon to the nanoparticles is 5~8:10~15.

7. The said preparation method of the nano-organosilicon film-forming and hydrophobic shale surface hydration inhibitor according to claim 3, wherein in step (2), the said stirring speed is 150~300 r/min, the said reaction temperature is 40~60° C., and the reaction time is 1~2 h.

8. The said preparation method of the nano-organosilicon film-forming and hydrophobic shale surface hydration inhibitor according to claim 3, wherein, in step (3), the mass ratio between the surface-active agent and the nanoparticles is 5~8:8~12.

9. The said preparation method of the nano-organosilicon film-forming and hydrophobic shale surface hydration inhibitor according to claim 3, wherein, in step (3), the said stirring speed is 500~700 r/min, the said reaction temperature is 60~80° C., and the reaction time is 4~6 h; part of the solvent is removed with the vacuum distillation method to obtain the nano-organosilicon hydrophobic shale surface hydration inhibitor with a solids content of 20-22%; the pressure of the vacuum distillation is 0.1 MPa, and the temperature is 50° C.

* * * * *